United States Patent [19]

Allen et al.

[11] 4,320,078

[45] Mar. 16, 1982

[54] PROCESS FOR MAKING MARBLEIZED GYPSUM POTTERY

[76] Inventors: Harvey D. Allen; Monte D. Allen, both of Rte. 1, Box 17, Comanche, Tex. 76442

[21] Appl. No.: 877,203

[22] Filed: Feb. 13, 1978

[51] Int. Cl.$^3$ .............................................. C04B 33/28

[52] U.S. Cl. ...................................... 264/73; 264/245; 264/311

[58] Field of Search ................. 264/73, 245, 311, 299; 106/111

[56] References Cited

U.S. PATENT DOCUMENTS 873,371 12/1907 Hippe .................................... 264/73

3,010,153 11/1961 Bittner ................................ 264/311

3,634,179 1/1972 Anderson ............................. 264/60

*Primary Examiner*—John A. Parrish

*Attorney, Agent, or Firm*—Gerald G. Crutsinger; John F. Booth; Monty L. Ross

[57] ABSTRACT

A process of making a porous, lightweight, insulative, inorganic container for plants having an ornamental marbleized appearance. A basic slurry formed of gypsum cement is poured into a rotating mold. While the basic slurry is being poured into the mold, one or more colored slurry mixtures are poured onto the stream of basic slurry such that the basic slurry and the colored slurry mixtures remain separated by an interface such that each stream of slurry maintains its integrity to form discrete markings of different colors in the wall of the cast container. The casting is allowed to cure for a period of 25-30 minutes in the mold at a temperature of about 70° F. After the casting has been removed from the mold, it is held in a controlled atmosphere at 120° F. and less than 40% relative humidity.

3 Claims, 2 Drawing Figures

PROCESS FOR MAKING MARBLEIZED GYPSUM POTTERY

BACKGROUND OF INVENTION

Containers for plants are usually constructed from one of two materials, clay or plastic.

In decorating with plants, the appearance of the container is often a very important design consideration. Heretofore the classic clay flower pot has been used extensively. However, the nature of the product does not lend itself to a wide range of colors. For this reason, plastic or fiberglass flower pots are often selected when decorative design is a major consideration.

Italian pottery known as Casetta Festonata and Triangolo di Frutta is very ornate and elegant. However, the clay material used in Italian pottery is found only in an isolated section of Italy and; therefore, is relatively expensive.

Terra Cotta is an Italian term for a type of hard, durable earthenware made from clay of a superior quality. Terra Cotta is used for pottery, flower pots, vases, monuments, fountains, and other objects. It is usually red or cream color, but can be made in almost any color and often has a marbleized appearance.

Heretofore, no process has been devised for forming containers for plants from a material other than the terra cotta clay having the appearance of Italian pottery which is inorganic, insulative and porous.

In addition to the appearance of containers for plants, it is important that the container be of a porous nature to permit greater aeration of the soil. The container preferably has insulation value to protect the plant from rapid temperature changes. If the container is constructed of an inorganic material, a build-up of mineral deposits and the growth of algae occurring on the rims of most planters is minimized. A build-up of mineral deposits on a container often causes crown and petiole rot.

Heretofore, processes have been devised, for example as disclosed in U.S. Pat. No. 2,280,488; U.S. No. 3,676,538; U.S. Pat. No. 4,017,573; and U.S. Pat. No. 4,017,574 for forming various products such that the product has a variegated or marbleized appearance. However, these processes have not been successfully employed for constructing flower pots, pottery, statues and similar articles.

SUMMARY OF INVENTION

We have devised a process for forming flower pots and similar articles of pottery from gypsum material such that the articles have a variegated marbleized appearance resembling that of terra cotta earthenware.

The process generally comprises the steps of mixing thirty parts water with one hundred parts gypsum cement reinforced with fiberglass fibers to form a batch of white raw basic slurry material; mixing twenty-five parts water with one-hundred parts concentrated green mortar color; and pouring the white raw basic slurry and the colored mixtures into a mold simultaneously to form a piece of pottery. The colored mixtures are of lighter density than the white raw basic slurry and therefore tend to float on the surface of the white basic slurry. While the white basic slurry is flowing into the mold the colored mixtures are poured onto the stream of the white slurry so that the materials are mixed in such a way as to maintain an interface between the streams to maintain a variegated or marbleized appearance throughout the wall of the piece of pottery.

After the material has been poured into a mold, it is allowed to set for at least twenty to twenty-five minutes at a temperature of 68 to 70 degrees Farenheit and at a low relative humidity, for example less than 40% relative humidity. The material is then removed from the mold and cured at a temperature in a range between 114 degrees and 126 degrees Farenheit for thirty-six hours.

The curing temperature is critical to the successful practicing of the process. If the curing temperature is too high, the material will crystalize and become brittle. Thus, the piece of pottery will be too fragile. If the curing temperature is too low, the color does not set and the colors flow together. Further, if the temperature is too low, the color will wipe off and the material will not harden. The same result is observed if too much water is employed in the mixture.

A primary object of the invention is to form a flower pot or other item of pottery from gypsum cement wherein the piece of pottery has a marbleized appearance.

Another object of the invention is to form a piece of pottery having a marbleized appearance which is of strong durable construction suitable for use as a flower pot.

A further object of the invention is to form a piece of pottery from gypsum cement wherein the article has the appearance of terra cotta earthenware.

A still further object of the invention is to form gypsum cement pottery having a marbleized appearance, the color being permanent so as not to wipe off or harm plants.

Other and further objects of the invention will become apparent upon referring to the detailed description hereinafter following and to the drawings annexed hereto.

DESCRIPTION OF THE DRAWING

Drawings of a preferred embodiment of the invention are annexed hereto so that the invention may be better and more fully understood; in which.

Numeral references are employed to designate like parts throughout the various figures of the drawing.

DESCRIPTION OF A PREFERRED EMBODIMENT

Figure 1:
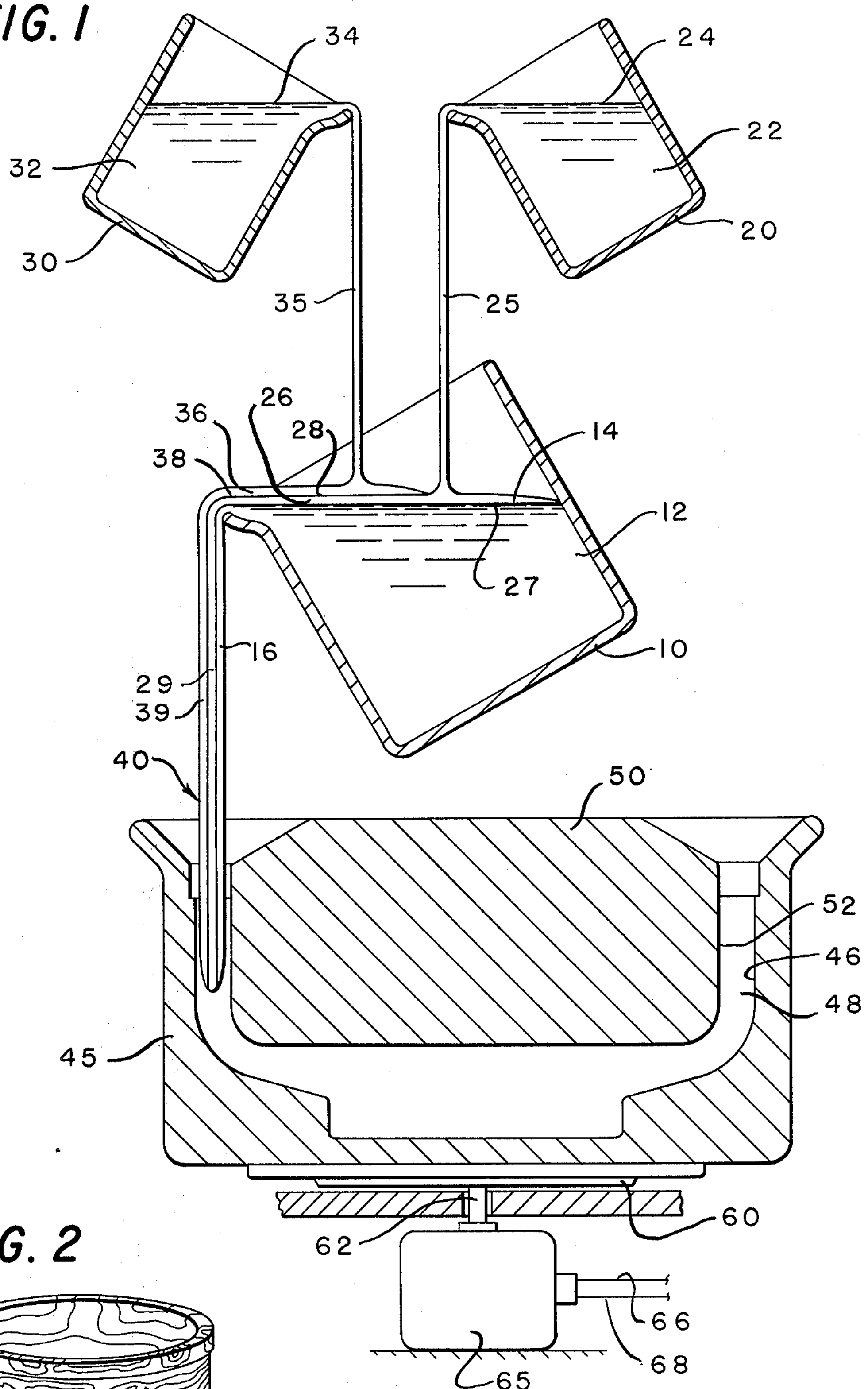
FIG. 1 is a diagrammatic view illustrating the method of forming the marbleized gypsum pottery.
Figure 2:
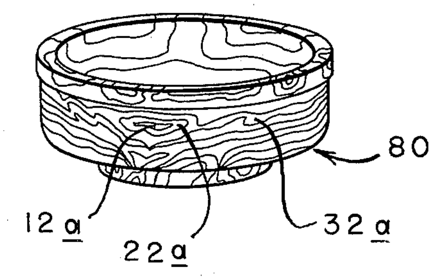
FIG. 2 is a perspective view of a piece of marbleized gypsum pottery.

The method of forming the marbleized gypsum pottery is diagrammatically illustrated in FIG. 1 of the drawing. A typical article formed by the process diagrammatically illustrated in FIG. 1 is illustrated in FIG. 2 of the drawing.

Referring to FIG. 1, the numeral 10 generally designates a container in which a batch 12 of white raw basic slurry material is mixed to be poured into the cavity of a mold 45.

The white raw basic gypsum slurry is formed by mixing 30 parts of water with 100 parts of gypsum cement. A suitable gypsum cement for the mixture is commercially available under the trademark "Denscal FF" available from Georgia-Pacific, Gypsum Division, of Portland, Ore. Denscal FF is a gypsum cement material formulated to provide high surface hardness and containing ten pounds of fiberglass fiber per one ton of gypsum cement material.

Container 10 should be heated to a temperature of approximately 70° F. as should be the water prior to mixing with the white gypsum material.

Referring again to FIG. 1 of the drawing, the numerals 20 and 30 generally designate containers in which batches of colored gypsum mortar is formed.

Container 20 contains a batch 22 of mortar mix of a first color and container 30 contains a batch 32 of mortar mix of a second color.

Colored mortar is formed by mixing approximately twenty-five parts of a mineral oxide powder with 100 parts "Denscal FF" to form a powdered concentrated mortar color mix.

Coloring compounds are commercially available from the Color Division of Solomon Grinding Company of Springfield, Ill. The coloring material is generally referred to as double strength mortar color and is available in the colors red, blue, yellow and green, among others. To obtain red coloring, red oxide of iron might be employed; to obtain blue, cobalt oxide might be employed; to obtain yellow, a synthetic oxide of iron or yellow ocher might be employed; and to obtain green, chromium oxide might be employed. Using various mixtures of these four basic colors, other colors may be obtained.

Generally, 25 parts of the color mix is mixed with 100 parts "Denscal FF" for forming a coloring compound. Twenty-five parts water is mixed with 100 parts of the concentrated color compound for forming batches 22 and 32 of colored mortar mix.

Containers 20 and 30 and the water mixed with powdered color mortar compound should be heated to a temperature of approximately 70° prior to mixing.

As hereinbefore discussed, it is important that the temperature of each constituent of batches 12, 22 and 32 be maintained at a temperature of approximately 70° F. preparatory for mixing. Water and the dry powdered gypsum material and coloring compounds, if used, should be thoroughly mixed, for example for about 45 seconds.

The coloring agents added to the gypsum cement reduce the density and viscosity of the batch of material. Thus, the colored gypsum material in colored batches 22 and 32 is less dense than the raw basic gypsum slurry of batch 12 in container 10.

Mold 45 is of conventional design and may be constructed of latex rubber or aluminum. The mold has a hollow internal portion defined by an inner wall 46 having a configuration shaped for casting the outer surface of an article 80 to be formed therein. Mold 45 is preferably a two-part mold having a separation point at a central portion thereof so that the mold halves can be moved laterally to remove a casting therefrom. This facilitates forming ornamental designs on the outer surface of vessel 80 which would be damaged in removing a casting from a one piece mold. The plug or male portion 50 of mold 45 extends into the central cavity in mold 45 for forming an annular passage 48 between the inner wall 46 of mold 45 and the outer wall 52 of plug 50.

Mold 45 may be positioned on a turntable 60 which is driveably connected to a shaft 62 driven by an electric motor 65, as diagrammatically illustrated in FIG. 1 of the drawing. Motor 65 is connected through conductors 66 and 68 to any suitable source of electricity. However, container 10 may be moved for dispensing the composite stream 40 of slurry into mold 45. Agitation of slurry in mold cavity 48 should be minimized.

Motor 65 preferably rotates turntable 60 and mold 45 carried thereon at a speed of approximately 2 to 10 revolutions per minute. The speed of rotation of mold 45 or container 10 may be adjusted depending upon the flow characteristics of material in batches 12, 22 and 32; and depending upon the appearance desired in forming a pattern in the casting to be formed in mold 45. As hereinbefore pointed out, the exact portions of coloring compound to be mixed with gypsum cement for forming batches 22 and 32 may vary depending upon the color desired. For example, a smaller amount of red coloring pigment would be used for forming a vessel 80 which is pink than would be used if the vessel were to be red.

Since the material in batches 22 and 32 of colored gypsum material is less dense than the gypsum material in batch 12, material from batch 22 and 32 tends to float on the surface of material in batch 12. However, the colored slurry in batch 22 tends to become mixed with the raw basic slurry in batch 12 if allowed to stand or if the materials are stirred. Otherwise stated, the pigment in batch 22 at the adjoining surfaces between material from batch 22 and from batch 12 tends to migrate toward batch 12 such that, for example red pigment in batch 22 tends to mix with the raw white gypsum slurry in batch 12 to form a composite pink batch of material.

To overcome this difficulty, we have discovered that if material from a first batch 12 is poured from container 10 into the annular mold cavity 48 while mold 45 is rotating, colored material from batch 22 in container 20 can be poured in a stream 25 onto the upper surface 14 of material in batch 12 to form a layer 26 of colored material 22. We have observed that an interface is formed between the upper surface 14 of material in batch 12 and the lower surface 27 of the layer 26 of material from batch 22. Since the upper surface 14 of material in batch 12 is moving to form a stream 16 flowing into the mold cavity 48, and since the lower surface 27 of material in layer 26 from batch 22 is also moving to form a stream 29, the interface between streams 16 and 29 is maintained to some degree. Within the time that material is flowing into the mold, color pigment does not migrate between materials from batch 22 and batch 12 to a degree which is sufficient to destroy the discrete markings of the differently colored materials flowing into the mold cavity 48.

In the process illustrated in FIG. 1 of the drawing, container 30 contains a batch 32 of a different color from that of batch 22 to provide further color variation or design in the vessel 80 to be formed. Material from batch 32 is poured in a stream 35 onto the upper surface 28 of the layer 26 of material from batch 22. Material from stream 35 forms a layer 36 having a lower surface 38 engaging the upper surface 28 of layer 26 of material from batch 22. Thus, an interface is formed between layers 36 and 26 in the same manner as hereinbefore described between the lower surface 27 of layer 26 and the upper surface 14 of batch 12.

In view of the foregoing it should be readily apparent that a composite stream 40 of material comprising streams 16, 29 and 39 of materials from the batches 12, 22 and 32, respectively, of gypsum slurry flows into the cavity 48 of mold 45. Since mold 45 is rotating the material from stream 40 is spread throughout the mold cavity 48 and to some extent, centrifugal force exerted upon material in the mold cavity overcomes forces of gravity for maintaining the material in streams 29 and 39 within the mass of material in the mold cavity 48 such that a casting 80 will have discrete markings of different colors which are visible on inner and outer surfaces thereof.

It should be readily apparent that by varying the speed of motor 65 while composite stream 40 of material is flowing into the cavity 48 or by varying the flow rate of the materials forming stream 40, the ornamental appearance of the casting 80 can be varied or controlled.

When the stream 40 of material is poured into the mold 45, mold 45 should be at a temperature approximately equal to that of the slurry and the atmosphere adjacent thereto.

After mold cavity 48 has been filled with slurry from batches 12, 22 and 32, the casting is partially cured in the mold 45 by allowing it to set for a period of 25 to 35 minutes while maintaining temperature between 68° and 70° F. and at a low relative humidity for example less than 40% relative humidity. After the material has partially cured, the casting 80 is removed from mold 45 and moved to a curing room wherein the temperature is maintained in a range between 114° and 126° F. and the relative humidity is maintained at less than 40% relative humidity. Casting 80 is maintained in the curing room for a period of at least 36 hours for completing the product.

A casting formed by the process hereinbefore described is illustrated in FIG. 2 of the drawing. If a white raw basic slurry 12, a yellow slurry 22 and a green slurry 32 are employed in the process hereinbefore described, casting 80 has discrete areas 12*a* which are white, areas 22*a* which are yellow, and areas 32*a* which are green. It should be appreciated that areas 12*a*, 22*a*, and 32*a* are somewhat randomly formed to produce a variegated or marble-like appearance on outer surfaces of the casting 80. In some areas streams 16, 29 and 39 may blend together while in other areas the streams are maintained almost completely separated with regard to migration of the pigment so that the overall appearance of the casting very closely resembles that of expensive terra cotta earthenware which has, heretofore, required the use of clay of superior quality found only in Italy.

Casting 80, in addition to having a pleasing appearance, if constructed in accordance with the process set forth above, is porous to permit aeration of soil, is a relatively good insulator to protect the plants from rapid temperature changes, and is an inorganic material which is not highly susceptible to a build-up of mineral deposits.

We have observed that if the curing temperature is too high, the material will crystalize and become brittle. Thus, the piece of pottery will be too fragile.

We have also observed that if the curing temperature is too low, the color does not set and the colors flow together. Further, if the curing temperature is too low, the color will wipe off and the material will not harden properly. The same result is observed if too much water is employed in the mixture.

When the process is carried out as set forth above, the casting 80 has a dry compressive strength of approximately 11,000 pounds per square inch and a hardness of 110. The color pigment sets and does not wipe off or flow through the material when casting 80 after curing becomes wet. Further, the mineral oxide pigment in the coloring is stable and is not harmful for plants potted in the container.

In view of the foregoing it should be readily apparent that the process which we have devised for forming a casting is particularly adapted for containers for plants and accomplishes the objects of the invention hereinbefore enumerated.

While we have disclosed a preferred embodiment of our invention, it should be readily apparent that other and further embodiments may be devised without departing from the basic concept thereof.

Having described our invention, we claim:

1. A process for making a hard, durable, porous, article of gypsum cement having a varigated or marbelized appearance comprising the steps of: forming a first batch of gypsum material by mixing 30 parts water with 100 parts gypsum cement reinforced with fiberglass fibers; forming a second colored batch of gypsum material by mixing 25 parts water with 100 parts concentrated mortar color; pouring material from the second colored batch of gypsum material onto the surface of the first batch of gypsum material such that an interface is formed between the first and second batches of gypsum material; pouring the first and second batches of gypsum material into an impervious mold such that the gypsum material of the first batch and the colored gypsum material of the second batch forms a casting of gypsum cement having discrete markings of different colors; partially curing the casting in the impervious mold at a first controlled temperature range between sixty-eight degrees and seventy degrees Fahrenheit; removing the casting from the impervious mold; and completing curing the casting out of the mold at a second controlled temperature range between 114 degrees and 126 degrees Fahrenheit.

2. A process for making a hard, durable, porous, gypsum article according to claim 1, with the addition of the step of maintaining the relative humidity of the atmosphere adjacent the casting at less than 40% relative humidity while the casting is curing for a period of at least 36 hours after the casting has been removed from the mold.

3. A process for making a hard, durable, porous, gypsum article according to claim 1, with the addition of the step of: rotating the impervious mold relative to the gypsum material while the gypsum material from the first and second batchs is flowing into the impervious mold.

* * * * *